United States Patent [19]

Cowan et al.

[11] 4,356,096
[45] Oct. 26, 1982

[54] METHOD OF ENHANCING THE EFFECT OF LIQUID ORGANIC LUBRICANTS IN DRILLING FLUIDS

[75] Inventors: Jack C. Cowan, Lafayette, La.; Tommy Thrash, Littlefield, Tex.; Jerry R. Rayborn, New Orleans, La.

[73] Assignee: Venture Chemicals, Inc., Lafayette, La.

[21] Appl. No.: 269,430

[22] Filed: Jun. 1, 1981

[51] Int. Cl.$^3$ ............................................... C09K 7/02
[52] U.S. Cl. .............................. 252/8.5 C; 252/8.55 R
[58] Field of Search ............. 252/8.5 C, 8.5 P, 8.55 R

[56] References Cited

U.S. PATENT DOCUMENTS

| | | | |
|---|---|---|---|
| 2,773,030 | 12/1956 | Tailleur | 252/8.5 |
| 2,816,073 | 12/1957 | Stratton | 252/8.5 |
| 3,047,493 | 7/1962 | Rosenberg | 252/8.5 |
| 3,310,125 | 3/1967 | Darley | 252/8.5 |
| 3,761,410 | 12/1973 | Mondshine et al. | 252/8.5 |

*Primary Examiner*—Herbert B. Guynn
*Attorney, Agent, or Firm*—Roy F. House

[57] ABSTRACT

Provided is a method of reducing the torque required to rotate the drill string in a rotary well drilling process which comprises adding to the drilling fluid which is being circulated in the wellbore a liquid organic lubricant and a hydrophobic, organophilic, water wettable sorbent. The sorbent preferentially sorbs the lubricant and deposits it in the wall cake on the sides of the borehole thus making it available for lubricating the drill string.

7 Claims, No Drawings

METHOD OF ENHANCING THE EFFECT OF LIQUID ORGANIC LUBRICANTS IN DRILLING FLUIDS

This invention relates to well working compositions and to processes to improve the lubricating properties of such compositions.

In the rotary drilling of wells for oil and gas, drilling fluids ("muds") are circulated in such a manner as to remove cuttings and to support the walls of the borehole. During drilling there arise various problems associated with the properties of the drilling fluid. Several of these are related to the lubricating characteristics of the mud, i.e., slow drilling rate, excessive drill pipe torque and drag, differential sticking, etc. No hole is always vertical, and since the drill string is flexible, the rotating drill pipe will bear against the side of the borehole at numerous points. The frictional resistance thus generated requires considerable extra torque to rotate the drill pipe and extra power to raise or lower the drill string in the hole. Differential sticking may occur when rotation is stopped if a part of the drill pipe is in contact with the wall cake on the side of the borehole. These conditions are alleviated by the addition of lubricants to the drilling fluid.

Many materials have been proposed for use as lubricants or lubricity additives, including petroleum oils, vegetable oils, fatty acids, sulfurized fatty acids, sulfonated fatty acids and triglycerides, fatty alcohols, plastic beads, glass beads, and the like.

It has been found that the performance of liquid organic lubricants is very erratic due to the wide variation in composition of drilling fluids. Thus, most lubricants are inefficient in muds containing calcium salts. Many lubricants are not effective in muds containing lignosulfonates and other dispersants. Lubricants are not effective when tightly emulsified in the mud.

Accordingly, there is a need for an additive to drilling fluids containing lubricants which will enhance the effectiveness of these lubricants in a wide variety of mud compositions.

It is an object of this invention to provide an additive for well working fluids which concentrates organic liquid lubricants in the wall cake on the side of the borehole.

It is another object of this invention to provide a process for increasing the effectiveness of organic liquid lubricants.

It is another object of this invention to decrease the torque required to rotate the drill string, particularly in highly deviated holes.

These and other objects of this invention will appear to one skilled in the art as the description thereof proceeds.

In accordance with one illustrative embodiment of our invention, we have found that hydrophobic, organophilic, water wettable absorbents, hereinafter sometimes referred to as HOWWA, will preferentially sorb (both adsorb and absorb) organic liquid lubricants and filter out or deposit in the wall cake on the sides of a borehole resulting in an increased concentration of the lubricant in the wall cake where it is needed. Concurrently, the particles of HOWWA will generally reduce the thickness of the wall cake and strengthen it by reinforcement. In low premeability sands or in micro-fractured shales and carbonates, the HOWWA also reduces the seepage loss of drilling fluid to the formation thus reducing the tendency for differential sticking. Concentration of liquid organic materials by the HOWWA, including oils such as diesel oil which are also added to drilling fluids as shale control additives, on the surface of the borehole helps provide both a surface coating and a sealing mechanism that assists in stabilizing the sides of the borehole.

Used alone, the HOWWA has very little direct effect on the lubricity of a drilling fluid. The term "lubricity" as used herein refers to that lubrication characteristic of drilling fluids which is dependent upon the friction which occurs between the drill pipe and drill collars and the filter cake on the walls of the borehole and/or the casing within the borehole. Hence it refers to that lubrication characteristic of drilling fluids operative under low load, nonextreme pressure conditions.

Lubricating additives useful in this invention may be selected from the group consisting of petroleum oils and fractions thereof, vegetable oils, animal fats, fatty acids, fatty acid esters, fatty amides, fatty alcohols, sulfurized vegetable oils, sulfated vegetable oils, sulfurized animal fats, sulfated animal fats, sulfurized fatty acids, sulfated fatty acids, sulfurized fatty amides, sulfated fatty amides, sulfurized fatty acid esters, sulfated fatty acid esters, sulfurized fatty alcohols, sulfated fatty alcohols, fatty phosphate esters, sulfonated asphalts and asphaltenes, and mixtures thereof.

The term "liquid" when used in connection with the organic lubricants disclosed herein is intended to mean not only those lubricants which are liquid but also includes those lubricants which disperse, emulsify or otherwise subdivide in the drilling fluid and thus become available for sorption by the HOWWA. In contrast, organic lubricants such as copolymer beads as disclosed in Rayborn U.S. Pat. No. 4,063,603 cannot be sorbed by the HOWWA and are excluded from this invention. However, under conditions of severely deviated boreholes, the addition of such solid lubricants in addition to the lubricants and HOWWA of this invention may be conveniently employed to decrease the torque required to rotate the drill string.

The term "fatty" as used in connection with the disclosed lubricants of this invention refers to an aliphatic organic radical containing at least 8 carbon atoms, preferably at least 10 carbon atoms. Aliphatic is used here in its broad sense as defined in Webster's Seventh New Collegiate Dictionary, 1963, G.&C. Merriam Co., Springfield, Mass., viz: belonging to a group of organic compounds having an open-chain structure and consisting of the paraffin, olefin, and acetylene hydrocarbons and their derivatives.

Exemplary lubricating additives are given in Mondshine U.S. Pat. No. 3,761,410, incorporated herein by reference.

The absorbents which are useful in our invention are any materials which are hydrophobic, organophilic and water wettable.

The term "hydrophobic" as used herein indicates that the sorbent will float when added to water. The term "organophilic" as used herein indicates that the sorbent will preferentially sorb oil and collect in the oil phase when added to a mixture of oil and water. The term "water wettable" as used herein indicates that the sorbent will be wetted by water when agitated in water, as by mixing.

Suitable HOWWA include the following sorbents, the U.S. patents of which are incorporated herein by reference: U.S. Pat. No. 2,211,976—treated cellulose fibers; U.S. Pat. No. 3,464,920—organosilane treated materials; U.S. Pat. No. 3,536,615—carbon coated particulate materials; U.S. Pat. No. 3,562,153—particulate materials coated with a colloidal hydrophobic metal or metalloid oxide; U.S. Pat. No. 3,791,990—dried peat; and U.S. Pat. No. 4,240,800—dried bagasse.

Cellulose fibers may be rendered hydrophobic by incorporating therein a phenol containing at least one aliphatic or cycloaliphatic residue having at least 6 carbon atoms, and treating the fibers with an aliphatic aldehyde. The phenol and aldehyde treatments may be effected simultaneously, or their condensation product may be used directly, and the treated fibers subjected to heat treatment.

Cellulose may also be rendered hydrophobic by surface treating cellulose with a Lewis-acid type catalyst and initiating polymerization of a hydrocarbon monomer to form a surface coating of hydrocarbon polymer on the cellulose. Thus cellulose dried to a moisture content of 3% can be cooled to $-80°$ in nitrogen and treated with a solution of $BF_3$ in liquid nitrogen. Isobutylene or $\alpha$-methylstyrene polymerize almost instantaneously upon contacting the treated cellulose.

All surface treatments of suitable hydrophilic sorbents must be such as to render the sorbents hydrophobic and organophilic while maintaining the ability of the sorbents to be wetted with water. Thus the extent of the surface treatment must not be such as to render the sorbent incapable of being wetted when agitated with water.

The HOWWA is preferably prepared by treating cellulose, preferably cotton linters, in an air dried condition, containing from about 0% to about 20% by weight water, with dry hydrochloric acid gas in an amount from about 0.3% to about 3% by weight of the cellulose at a temperature in the range from about 75° F. to about 200° F. during a treatment period from about 10 minutes to about 48 hours. During this treatment the cellulose is mechanically degraded by any convenient means such as by tumbling, buffing, augering, abrading, vibrating, etc. Thereafter the HOWWA may be further mechanically degraded, if desired, by any suitable grinding means such as a hammer mill. During the processing of this HOWWA it is important that no subsequent washing out or neutralization of the HCl gas be undertaken. In this manner the combination of the gaseous hydrochloric acid, temperature, and mechanical action are sufficient to produce a surface modified cellulose which is of extremely fine particle size. It is preferred to use a source of raw un-processed cellulose which has not been treated to remove any of the waxes or oils therefrom. In this manner there is produced a surface modified fibrous cellulose which is hydrophobic and organophilic. If a processed cellulose is used as the source of cellulose, the resulting dry HCl-treated cellulose can be surface modified to enhance its oleophilic properties, such as by reaction with organosilanes, amines, and the like.

The hydrophobic and organophilic character of the HOWWA is necessary as it enables the HOWWA to sorb the organic liquid lubricants and thereafter concentrate them in the wall cake. Although hydrophobic and organophilic the HOWWA readily wets in water containing a surfactant or upon agitation. Furthermore, the HOWWA is effective in all aqueous systems including saturated brines.

More details concerning the preparation of this form of HOWWA may be found in our copending application Ser. No. 269,493 filed on even date herewith entitled: Well Working Compositions, Method of Decreasing the Seepage Loss from Such Compositions, and Additive Therefor.

The particle size of the HOWWA must exhibit a wet screen analysis of at least 95% by weight passing through a 100 mesh (U.S.) screen. That is, at least 95% by weight of the HOWWA present in a water suspension will pass through a 100 mesh screen.

One embodiment of our invention provides a process to decrease the torque required to rotate the drill string which comprises adding to the drilling fluid an organic liquid lubricating additive and the HOWWA each as described herein. Generally, there will be required from about 2 ppb. to about 10 ppb. lubricating additive and from about 2 ppb. to about 10 ppb. HOWWA preferably from about 4 ppb. to 8 ppb. of each. One method is to add both the HOWWA and lubricating additives separately to the drilling fluid over several circulations of the fluid in the borehole.

Another method of adding the HOWWA is in a slug treatment. In this instance a concentrated "pill" of lubricant and HOWWA is prepared and pumped slowly around the borehole. This technique allows a concentrated slug of lubricant and HOWWA to contact the wall of the borehole and thus concentrate the lubricant immediately in the wall cake. In this treatment, concentrations of about 100 ppb. to about 150 ppb. of HOWWA can be added to diesel oil or a liquid lubricant having a low viscosity. This concentration will be readily pumpable. However, continuous agitation or a suspending agent should be provided to keep the HOWWA from settling out if the pill is not used immediately. Higher viscosity lubricating additives can contain 50–75 ppb. of HOWWA and still maintain a pumpable slurry. Testing to determine the actual amount suitable for a particular oil or lubricant can be readily undertaken.

Another embodiment of our invention provides a process of increasing the concentration of liquid organic lubricants in the wall cake of a borehole which comprises adding to the drilling fluid containing the lubricant the hydrophobic, organophilic, water wettable sorbent of this invention in an amount from about 2–10 ppb., preferably 4–8 ppb.

In order to more completely describe the invention, the following non-limiting examples are given.

EXAMPLE 1

A HOWWA was prepared by treating raw, untreated cotton linters with 1.5% by weight dry HCl gas at a temperature in the range from about 130° F. to about 160° F. for about 10 minutes in an apparatus designed to tumble the cotton linters. Thereafter the treated cotton linters were buffed, screened and air classified. This HOWWA is hydrophobic, organophilic and water wettable as evidenced by the fact that it floats when added to water, it preferentially sorbs and collects oil from a mixture of oil and water, and that it is readily wetted when agitated in water. 95% by weight of the HOWWA, when suspended at a concentration of 5% by weight in water, with agitation, will pass through a 100 mesh screen.

A fresh water lignite-surfactant drilling fluid was being used to drill a well. The drilling rate was 8 ft./hr. at a rotary speed of 120 rpm. and a weight on bottom of 120,000 lb. Treatment of this fluid with 3% by volume diesel oil did not reduce the torque required to rotate the drill pipe. Addition of 4 lb./bbl. of the HOWWA resulted in a 50% reduction in the torque (from 800 amps to 400 amps). For maintenance treatment, 5 bbl. slugs of diesel oil containing 100 lb./bbl. of the HOWWA were pumped into the well as every 100 feet of hole was drilled. The torque remained low for the duration of drilling, 400–500 amps, and the drilling rate increased to 13 ft./hr.

EXAMPLE 2

Peat fibers containing 9% moisture prepared according to the teaching of U.S. Pat. No. 3,791,990 were ground and air classified such that 95% by weight, when suspended at a concentration of 5% by weight in water containing a surfactant, passed through a 100 mesh screen.

The drill pipe became stuck in a well being drilled with a potassium chloride aqueous base mud containing potassium lignite and bentonite. After several hours of working the pipe, the pipe was still stuck and resisted.

A 25 bbl. pill of diesel oil containing 125 lb./bbl. of this ground and dried peat, 3 ppb. of organophilic attapulgite suspending agent, and 2% by volume methanol was spotted at the location where the pipe was stuck. After working the pipe 1.5 hours the pipe was freed. Thereafter the pill was circulated through the system. Maintenance of about 4% by volume diesel oil and 6 ppb. HOWWA prevented any further differential sticking and maintained a low rotary torque. Additionally, the seepage loss of this mud to the formation was reduced from about 200 bbl./day to about 40 bbl./day.

EXAMPLE 3

A pre-hydrated bentonite, ferro-chrome lignosulfonate sea water mud was being used to drill a 25° deviated hole. An excess of 25,000 lb. of drag occurred on making connections and 700 amps were required to rotate the drill pipe. The penetration rate was 15 ft./hr. Five lb./bbl. castor oil and 5 lb./bbl of bagasse prepared according to the teaching of Example 1 of U.S. Pat. No. 4,240,800, and ground as required, were added to the drilling fluid. No excess drag occured on subsequent connections and the ampage required to rotate the drill pipe decreased to 500 amps. The drilling rate increased to 24 ft./hr.

We claim:

1. A method of increasing the effectiveness of a liquid organic lubricant in a water base well drilling fluid which comprises adding to the drilling fluid containing the lubricant a hydrophobic, organophilic, water wettable sorbent to sorb the lubricant and concentrate the lubricant on the sides of the borehole in which the drilling fluid is circulated, said lubricant being selected from the group consisting of petroleum oils and fractions thereof, vegetable oils, animal fats, fatty acids, fatty acid esters, fatty amides, fatty alcohols, sulfurized vegetable oils, sulfated vegetable oils, sulfurized animal fats, sulfated animal fats, sulfurized fatty acids, sulfated fatty acids, sulfurized fatty amides, sulfated fatty amides, sulfurized fatty acid esters, sulfated fatty acid esters, sulfurized fatty alcohols, sulfated fatty alcohols, fatty phosphate esters, sulfonated asphalts and asphaltenes, and mixtures thereof, and said sorbent being selected from the group consisting of cellulose fibers which have been surface treated to be hydrophobic and organophilic, peat, bagasse, and mixtures thereof, said sorbent having a particle size such that at least 95% by weight thereof present in a water suspension will pass through a 100 mesh screen.

2. The method of claim 1 wherein from about 2 lb./bbl. to about 10 lb./bbl. of the sorbent is added to the drilling fluid.

3. The method of claim 2 wherein the drilling fluid contains from about 2 lb./bbl/ to about 10 lb./bbl. of the lubricant.

4. A method of reducing the torque required to rotate the drill string in a rotary drilling process for drilling a well in which a water base drilling fluid is circulated down the drill pipe and up through the annular space between the drill pipe and up through the annular space between the drill pipe and the sides of the borehole, which comprises admixing with the water base drilling fluid from about 2 lb./bbl. to about 10 lb./bbl. of a liquid organic lubricant and from about 2 ppb. to about 10 lb./bbl. of a hydrophobic, organophilic, water wettable sorbent, said lubricant being selected from the group consisting of petroleum oils and fractions thereof, vegetable oils, animal fats, fatty acids, fatty acid esters, fatty amides, fatty alcohols, sulfurized vegetable oils, sulfated vegetable oils, sulfurized animal fats, sulfated animal fats, sulfurized fatty acids, sulfated fatty acids, sulfurized fatty amides, sulfated fatty amides, sulfurized fatty acid esters, sulfated fatty acid esters, sulfurized fatty alcohols, sulfated fatty alcohols, fatty phosphate esters, sulfonated asphalts and asphaltenes, and mixtures thereof, and said sorbent being selected from the group consisting of cellulose fibers which have been surface treated to be hydrophobic and organophilic, peat, bagasse, and mixtures thereof, said sorbent having a particle size such that at least 95% by weight thereof present in a water suspension will pass through a 100 mesh screen.

5. The method of claims 1, 2, 3, or 4 wherein said sorbent is prepared by treating cellulose containing from about 0% to about 20% by weight water with dry hydrochloric acid gas in an amount from about 0.3% to about 3% by weight of the cellulose at a temperature in the range from about 75° F. to about 200° F. during a treatment period from about 10 minutes to about 48 hours.

6. The method of claims 1, 2, 3, or 4 wherein said lubricant is selected from the group consisting of petroleum oils and fractions thereof, vegetable oils, and mixtures thereof.

7. The method of claims 1, 2, 3, or 4, wherein said lubricant is selected from the group consisting of petroleum oils and fractions thereof, vegetable oils, and mixtures thereof, and wherein said sorbent is prepared by treating cellulose containing from about 0% to about 20% by weight water with dry hydrochloric acid gas in an amount from about 0.3% to about 3% by weight of the cellulose at a temperature in the range from about 75° F. to about 200° F. during a treatment period from about 10 minutes to about 48 hours.

* * * * *